July 9, 1968  R. GOTTSCHALD  3,391,955

JOINTS

Filed Oct. 21, 1965

Inventor
RUDOLF GOTTSCHALD
BY
ATTORNEYS

United States Patent Office 3,391,955
Patented July 9, 1968

3,391,955
JOINTS
Rudolf Gottschald, Osterath am Meerbusch, Germany, assignor to A. Ehrenreich & Cie.
Filed Oct. 21, 1965, Ser. No. 500,408
Claims priority, application Germany, May 19, 1965, E 29,333
2 Claims. (Cl. 287—90)

ABSTRACT OF THE DISCLOSURE

The subject invention relates to a ball joint having particular application in the linkage of the steering gear of a motor vehicle. Basically, the joint is formed of a casing having an internal cavity contoured to accommodate a bearing member which in turn accommodates the joint pin. To facilitate assembly, the joint casing also has an upper and lower opening which communicate with the internal cavity. The bearing member which fits the contour of the joint case cavity is mounted therein and has an axial opening through which the joint pin passes. The joint pin is formed with an enlarged ball head, the bottom of which is contoured to mate with a closure and the top of which is contoured to mate with a closure disc for the upper case joint opening. The closure disc for the upper opening is provided with a conically shaped internal surface that has a concave recess at its apex for the purpose of mating with and conforming to the convex surface of the enlarged pin ball head.

Figure 1:
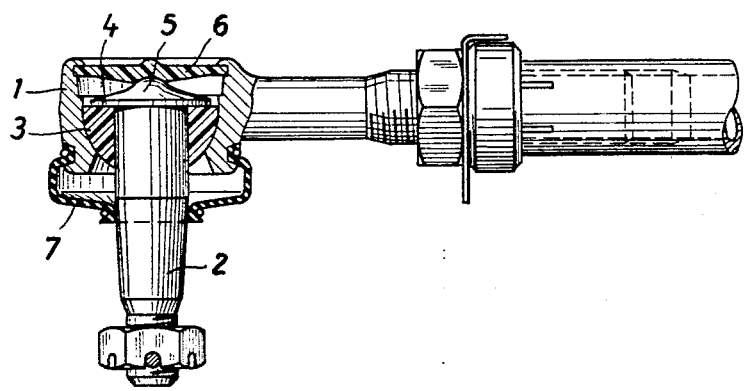

My invention relates to a joint, preferably intended for steering gears, especially of motor vehicles, in which the movable joint bolt passes a bearing element which is supported in the joint case in the direction of the joint bolt axle and in which the said bolt is supported at the said bearing against its leaving the joint case as well as with its head portion against the case lid, and the purpose of the said invention is to provide such a joint which may be assembled from preformed, but unprocessed parts.

The joints which are already known require more or less exact processing of the joint elements which have been produced, for instance, by forging, hammering or upsetting. This processing considerably influences the production costs of the joints.

The basic purpose of the invention is primarily to provide a joint which may be assembled from unprocessed parts, but which will meet the requirements as to accuracy and perfect running of the joint.

Particularly with a view to the realization of the said purpose, the joint, according to the invention, consists of an unprocessed case which is produced, for instance, by forging or hammering, of a joint bolt of the same kind which is produced, for instance, by forging or upsetting, of a bearing body which is made from plastic, preferably from polyurethane, and of a case lid which is made from plastic, preferably from acetal resin.

Although the bearing body preferably consists of polyurethane, it is also possible to make the same from acetal resin, acetal resin with an additional sliding agent, graphite with a binding agent and graphite with acetal resin.

In the joint according to the invention a plastic bearing surface is always coupled with a steel bearing surface which results in especially favorable bearing characteristics.

In the joint according to the invention inaccuracy and roughness originating from the production process are compensated by the plastic which has such properties that even rough and not altogether smooth surfaces will be able to glide on the same satisfactorily. The joint assembly of the subject invention is comprised of a joint case having both an upper and lower opening and an internal cavity, a polyurethane bearing member having an axial passage extending therethrough, a joint pin having an enlarged head and an acetal resin closure cap for the joint case upper opening. In the assembled form, the bearing member fits in the joint case cavity and the joint pin fits in the axial passage of the bearing member with the lower surface of the joint pin head abutting the upper surface of the bearing member. The closure for the case upper opening fits in an annular recess to effectively seal the case interior and is configured to have an inner conical shape terminating in a concave recess at the apex. The concave recess mates with the convex protuberance on the enlarged pin head.

The drawing shows two examples of a construction according to the invention.

Figure 2:
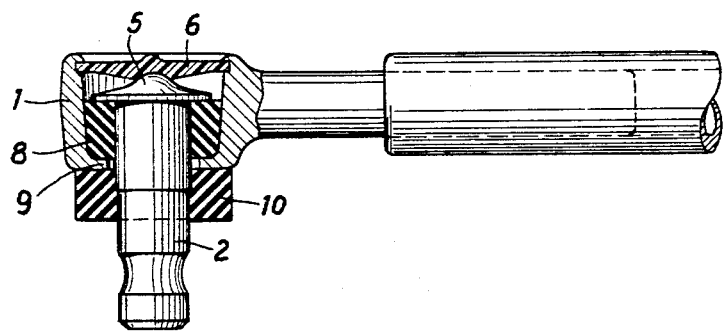

FIG. 1 is a vertical section of a ball joint.
FIG. 2 is a vertical section of a joint which is intended for rotary movements only.

The joints which are shown as examples of construction are intended for the tie rods. FIG. 1 shows a preferred construction of the invented object.

The ball joint which is shown in FIG. 1 has an unprocessed case 1 which is produced by forging and an unprocessed joint bolt 2 which is also produced by forging. The said joint bolt has been passed through the polyurethane spherical cap or polyurethane spherical segment 3 which is located in a hollow ball surface of the joint case. The shoulder 4 of the said joint bolt is supported by the said spherical segment. The center of the head surface of the joint bolt is provided with a convex protuberance 5. The convex protuberance 5 of the joint bolt mates with a centrally disposed concave recess on the inner surface of the closure disc 6. The closure disc 6 is formed of acetal resin and is configured to have a flat outer surface and a substantially conical inner surface with the concave recess being located at the cone apex. The sealing means for the opening through which joint bolt 2 passes is typical bellows seal 7. The joint according to FIG. 2 is substantially designed in the same manner as the ball joint according to FIG. 1. Since the joint bolt is intended to perform rotary movements only, a polyurethane shell 8 is inserted into the case chamber which shell is supported by an interior case shoulder 9 at that point where the joint bolt 9 leaves the case. Again, the closure disc 6 is formed of acetal resin. The wart-like elevation 5 of the joint bolt touches the said lid. The packing is defined as 20.

With both examples of construction the case chamber is conically extending towards the case end which is to be closed by the lid 6.

I claim:
1. A ball and socket joint assembly comprising;
   a joint casing having an upper opening, a lower opening and an internal cavity;
   a polyurethane annular bearing seated in the joint case cavity and having an axial passage extending therethrough;
   a joint bolt extending thru said axial passage and terminating in an enlarged head, the lower surface of which enlarged head rests on the upper surface of the polyurethane annular bearing;
   a centrally-disposed convex protuberance on the enlarged joint bolt head; and
   an acetal resin closure disc secured within the joint casing upper opening to provide a closure therefor and which closure disc has a substantially flat upper surface and a substantially conical lower surface with a concave recess at the apex of said conical surface which receives the convex protuberance on the enlarged joint bolt head.
2. A ball and socket joint assembly as described in claim 1 wherein the cavity in the joint casing is hemis- pherically shape and the polyurethane annular bearing is hemispherically contoured to fit within the joint case hemispherical cavity.

References Cited

UNITED STATES PATENTS

| | | | |
|---|---|---|---|
| 2,827,303 | 3/1958 | Herbenar | 287—85 X |
| 2,937,895 | 5/1960 | Langen et al. | 287—87 |
| 2,993,716 | 7/1961 | Langen | 287—90 |
| 3,068,031 | 12/1962 | Herbenar et al. | 287—90 |
| 3,091,486 | 5/1963 | Baker | 287—87 |
| 3,128,109 | 4/1964 | Flumerfelt | 287—90 |
| 3,257,133 | 6/1966 | Wight | 287—87 |

FOREIGN PATENTS

| | | |
|---|---|---|
| 1,299,403 | 6/1926 | France. |
| 188,525 | 3/1964 | Sweden. |

EDWARD C. ALLEN, *Primary Examiner.*

A. V. KUNDRAT, *Assistant Examiner.*